US005662292A

United States Patent [19]
Greene et al.

[11] Patent Number: 5,662,292
[45] Date of Patent: Sep. 2, 1997

[54] HELICOPTER ENGINE FILTER SYSTEM

[76] Inventors: Andrew T. Greene, 450 Clark Way, Angwin, Calif. 94508; Andrew D. B. Rowen, 1005 Elden Way, Beverly Hills, Calif. 90210

[21] Appl. No.: 434,444

[22] Filed: May 3, 1995

[51] Int. Cl.$^6$ ................................................ B64D 33/00
[52] U.S. Cl. ........................................................ 244/53 B
[58] Field of Search ........................ 244/53 B; 60/39.091, 60/39.092; 55/385.1, 521, 308

[56] References Cited

U.S. PATENT DOCUMENTS

| | | |
|---|---|---|
| 2,145,898 | 2/1939 | Simpson . |
| 2,178,614 | 11/1939 | Slayter . |
| 2,553,512 | 5/1951 | Cotton ........................................... 55/306 |
| 3,019,854 | 2/1962 | O'Bryant ..................................... 55/524 |
| 3,319,402 | 5/1967 | Ritchie ........................................... 55/306 |
| 3,421,296 | 1/1969 | Beurer ....................................... 244/53 B |
| 5,103,760 | 4/1992 | Johnson . |

OTHER PUBLICATIONS

Introducing The New Standard In Rotocraft Engine Air Filtration The Life*Span™ Series from Induction Technologies (INTEC) a Division of Tactical Aerospace Corporation.

*Primary Examiner*—Andres Kashnikow
*Assistant Examiner*—Tien Dinh
*Attorney, Agent, or Firm*—Fulwider Patton Lee & Utecht, LLP

[57] ABSTRACT

A specially contoured barrier type filter disposed in front of a helicopter turbine inlet provides for maximized airflow during forward, as well as sideways flight. The contouring additionally reduces the tendency of the filter to clog. A bypass mechanism is provided should the pressure differential across the filter exceed a predetermined value. The bypass configuration achieves a limited particle separation function in order to provide residual protection. An air box attached to the inlet is formed to provide low distortion levels in the airflow entering the engine inlet.

17 Claims, 4 Drawing Sheets

HELICOPTER ENGINE FILTER SYSTEM

BACKGROUND OF THE INVENTION

1. Field of the Invention

The present invention relates to systems for filtering air inducted into a turbine engine and, more particularly, pertains to barrier-type filtration systems for helicopter turbines.

2. Description of Related Art

A generally accepted approach toward filtering air supplied to a helicopter turbine engine comprises the use of aerodynamic particle separation principles. Such devices remove particulates by inducing vortex flow into the incoming air. Particulates contained in the air are thereby thrown outwardly leaving the core of the flow pattern relatively clean for induction into the engine. The periphery of the air flow, laden with the ejected particulates, is directed away from the intake, and discharged from the craft. Such systems have been favored because no scheduled replacement of filtering elements is necessary, although daily inspection is required. Particle separators do, however, suffer from a number of disadvantages, including a severely limited filtering capability. Such separators are able to achieve only about a 92% separation efficiency (A.C. Coarse Test Dust) which results in significant turbine, fan, and compressor erosion, especially when the craft is operated under severe conditions.

A further disadvantage associated with vortex-type particle separators is a direct result of the vortexed air flow. A significant amount of engine suction and resulting pumping loss is required to induce the incoming air flow to form a vortex and engine bleed air is used to purge the system. Additionally, the vortex itself is not conducive to an efficient flow of air into the engine by virtue of its distorted flow patterns, especially near the engine's intake ducting. These factors combine to significantly reduce the amount of power that would otherwise be available for powering the craft. A further limitation of prior art vortex type separator assemblies is that they are not sealed against water seepage which has been shown to allow ice to accumulate near the engine inlet with a resultant risk to flight safety in certain conditions.

Barrier-type filters offer a number of advantages over vortex-type particle separator which can reduce operating costs and increase safety. Particularly advantageous is the fact that air filtration efficiencies of greater than 99% are attainable. This has the immediate effect of substantially reducing engine wear thereby extending overhaul intervals, reducing unscheduled maintenance, and providing the ability to operate in adverse environments without engine damage concerns. Additionally, because no particulate laden air needs to be removed, no power robbing bleed air is required, while the absence of a vortex provides for a smoother air flow into the engine.

However, prior art barrier type filters fitted to helicopter turbines do suffer from a number of shortcomings. Adapting a flat filter element to the confines of a helicopter cowling presents significant packaging problems, while the resulting configuration yields less than optimum airflow and may be subject to icing. A problem that is inherent in barrier-type filters, and one that has not adequately been addressed in previously known adaptations thereof to helicopter applications, is the fact that the flow capacity of a barrier filter is a function of the direction of flow through the filter. A flat filter element oriented so as to maximize air flow when the craft is flown in a forward direction has considerably less flow capacity when the helicopter is flown sideways. Consequently, despite the fact that side openings may be provided in the helicopter's cowlings to provide airflow to the engine for this type of operation, the orientation of the filter is critical in optimizing the airflow that actually enters the engine.

Another disadvantage of barrier type filters results from the fact that filtrant necessarily accumulates and thereby gradually reduces airflow capacity. While this requires that the filter element be periodically cleaned or replaced, a more urgent concern is that such disposition to clog is especially problematic when the craft is operated under icing conditions. An impervious layer of built-up ice can quickly form as super cooled droplets suspended in the atmosphere freeze and cling to the filter element upon impact. Bypass mechanisms have been provided in the past whereby the pilot is able to completely bypass the filter when a clogged condition is indicated. However, the lack of any filtration of the air that results when air is inducted into the engine in such a manner is of concern. Additionally, previously know barrier filters are susceptible to failure as a result of the vibration to which they are subjected directly in front of a helicopter turbine inlet. Detachment of a sufficiently large portion of the filter element from its supporting frame and ingestion by the turbine could have catastrophic consequences.

A system is needed that allows the superior filtration capabilities of a barrier-type filter to be exploited in helicopter applications without the disadvantages attendant in previous configurations. More particularly, it would be most desirable for the filtration system to provide adequate airflow in all flight attitudes, to be less prone to clogging, especially as a result of icing, and to provide for a bypass capability that provides some residual protection. Finally, such system must be able to withstand the rigors of a high-vibration environment. The present invention meets all of these requirements.

SUMMARY

The present invention provides a barrier-type filtration system for helicopter turbines that overcomes the shortcomings of previous adaptation of barrier filters for such applications. The system's configuration serves to maximize airflow through the filter element for airflow approaching the filter from a variety of directions, including from along the aircraft's longitudinal axis, as well a from an angle thereto. Additionally, the filter system provides for the optimization of airflow into the engine after its filtration. This configuration additionally renders the filter element less prone to clogging, especially by the buildup of ice. Should bypass of the filter element nonetheless become necessary, a bypass mechanism is provided which is configured so as to achieve a limited particle separating function to thereby provide some residual protection. Finally, the construction and mounting of the filter element itself is substantially stronger than conventional barrier filters so that such element can withstand the sustained high vibrational loads encountered in the helicopter environment.

The filtration system of the present invention achieves the above-set-forth advantages with a contoured filter element that includes filtering surfaces that are oriented both perpendicular to the longitudinal axis of the aircraft, as well as surfaces that curve toward an orientation parallel thereto. The filter itself consists of pleated oil impregnated multilayer cotton fabric held between layers of bonded wire mesh with a final safety screen to protect the engine. The overall curvature of the filter element serves to strengthen the structure, and the potting of the edges of the material in a thick border of polyurethane serves to insulate the filter element from vibration.

The filter element is held in place by a rigid, sealed air box that is attached to the engine inlet. The box includes a bellmouth that provides a smooth transition into the turbine so as to maintain attached laminar flow pattern thereby minimizing distorted flow into the engine. Additionally, the air box includes a moveable flap that provides an alternate flow path to the engine. The flap is oriented such that incoming airflow must make a sharp change in direction of flow prior to induction into the air box, and a second sharp change in direction in order to enter the engine thereby achieving a particle separating effect. The pressure drop across the filter element is monitored at all times, and a warning signal is generated when the pressure change reaches a predetermined limit proven safe in FAA approved flight tests.

These and other features and advantages of the present invention will become apparent from the following detailed description of a preferred embodiment which, taken in conjunction with the accompanying drawings, illustrates, by way of example, the principles of the invention.

DETAILED DESCRIPTION OF PREFERRED EMBODIMENTS

The drawings illustrate the air filtration system of the present invention as adapted to a specific helicopter configuration. The system is attached directly to the turbine's inlet and is positioned completely within the existing cowling. Air entering the cowling, either through forward inlets or lateral inlets, must pass through the filter element to be inducted into the turbine.

Figure 1:
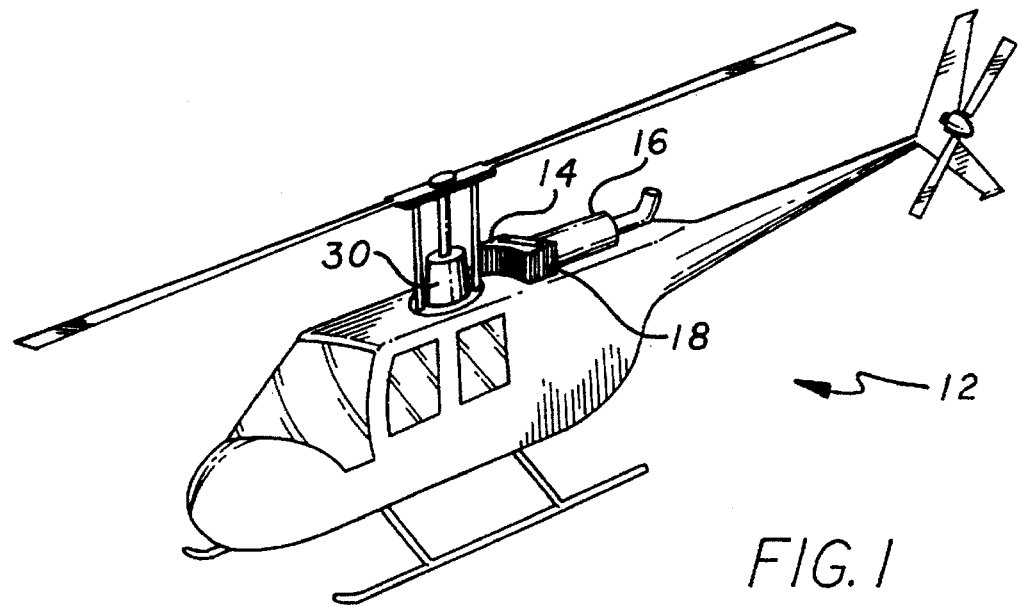
FIG. 1 is a cut away perspective view of the filtration system of the present invention as installed in a helicopter.

FIG. 1 is a perspective view of a helicopter 12 sans cowling showing the intake air filtration system 14 of the present invention as installed. The system is positioned directly in front of the inlet to the turbine 16. Its filter element 18 includes a filtering surface facing forwardly along the helicopter's longitudinal axis, as well as filtering surfaces facing laterally.

Figure 2:
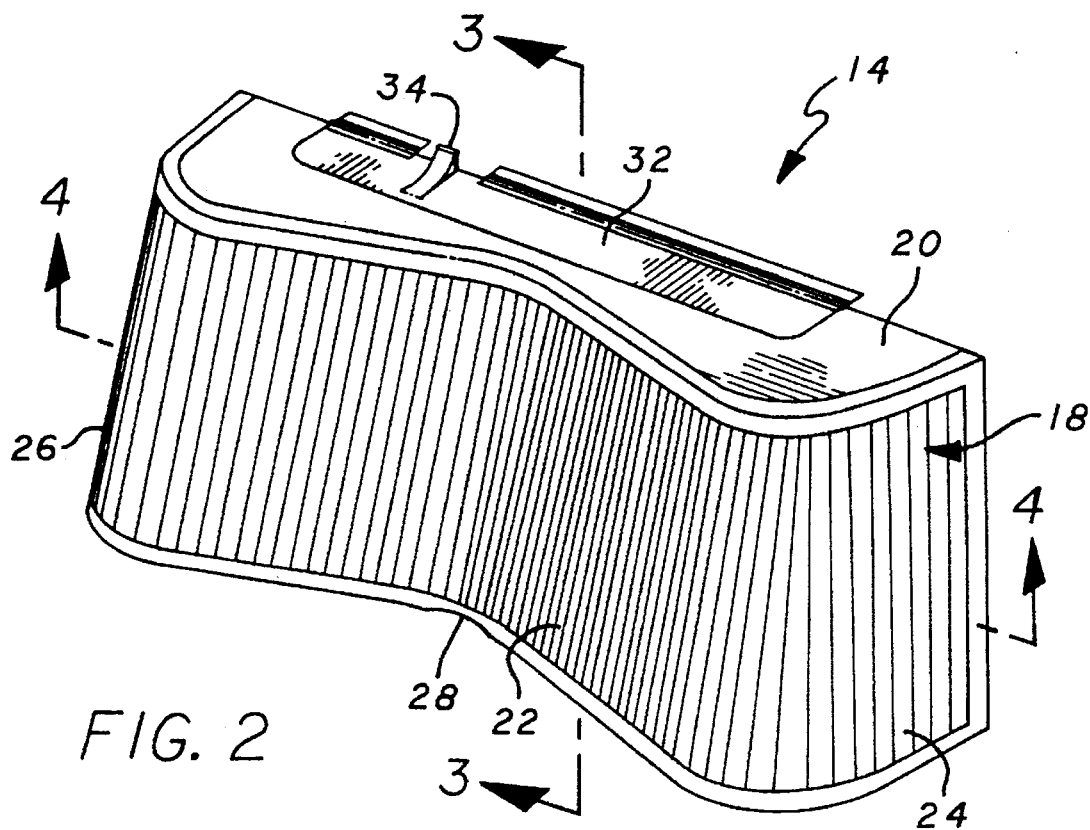
FIG. 2 is an enlarged perspective view of the filter element and air box assembly.

FIG. 2 is an enlarged cross-sectional view of the intake air filtration system 14 of the present invention. The system includes a rigid air box 20 that is attached to the turbine inlet and a filter element 18 that is, in turn, attached to the air box.

The filter element is contoured such that the majority of its surface area 22 faces forwardly and additionally curves to form two laterally facing sections 24, 26. The forwardly facing area is bowed slightly inwardly as is clearly visible in the drawing. Additionally, the filter element 18, as well as the air box 20, is formed at 28 to add strength and accommodate output shaft 38 extending between turbine 16 and transmission 30.

A bypass flap 32 is positioned along the top of air box 20. Upon deployment of activator 34, the flap is hinged upwardly to provide an alternate air path to the engine. The area uncovered by the flap is approximately twice that of the turbine inlet.

Figure 3:
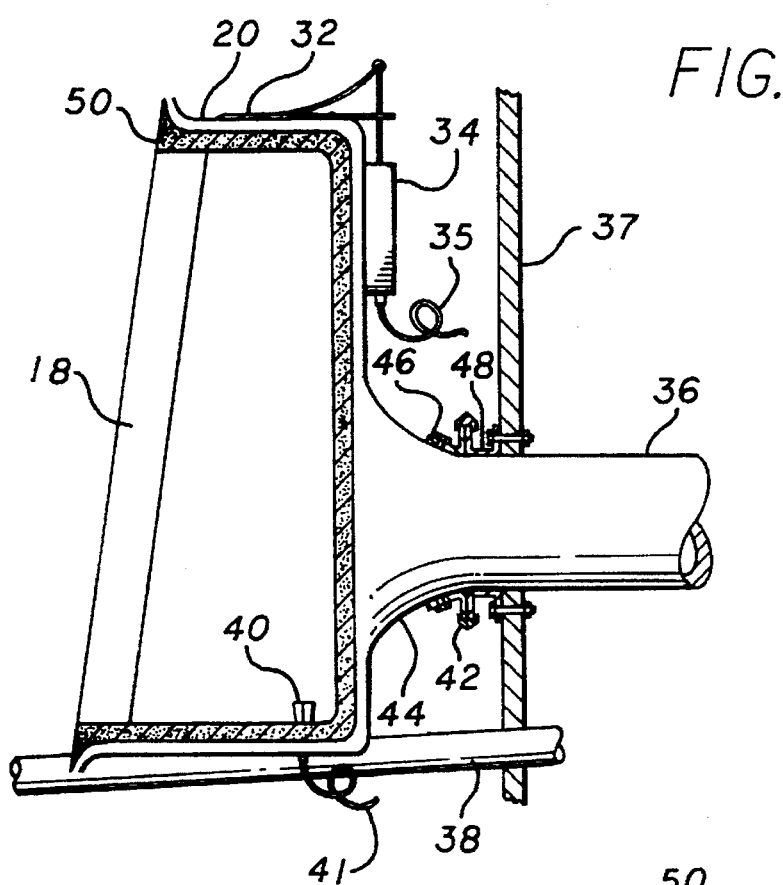
FIG. 3 is a cross-sectional view taken along lines 3—3 of FIG. 2.
Figure 4:
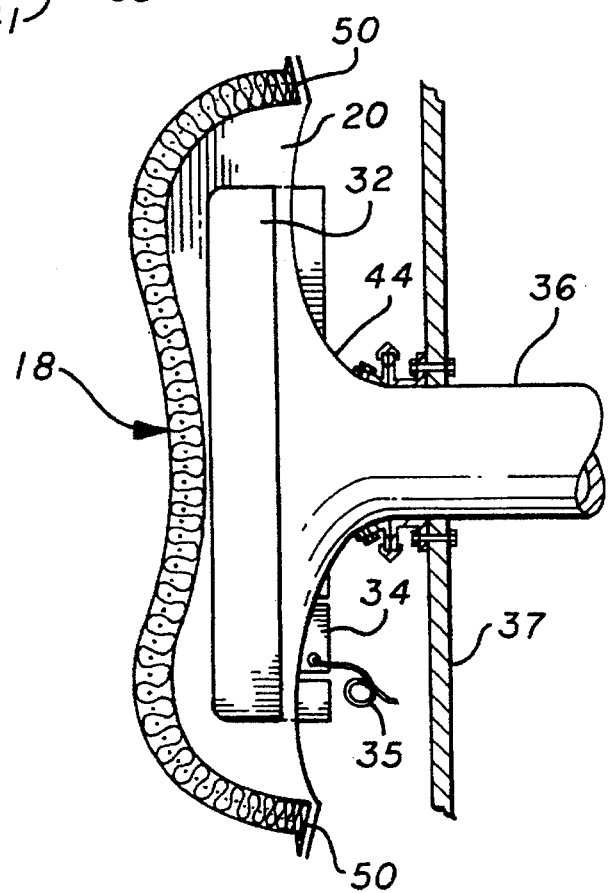
FIG. 4 is a cross-sectional view taken along lines 4—4 of FIG. 2.

The cross-sectional views of FIGS. 3 and 4 illustrate the positioning of the air filtration system relative the turbine inlet 36. The back side of air box 20 has a bellmouth 44 formed therein that provides a smooth second derivative curvature into the turbine inlet. A first annular mounting ring 46 rigidly attached to the bellmouth, and a second annular mounting ring 48 rigidly attached to fire wall 37 are joined by V-band clamp 42. FIG. 3 additionally shows output shaft 38 passing directly below the filtration system. The one-piece construction of the air box prevents the seepage of water into the area of the engine inlet.

The position of the bypass flap 32 disposed along the top of air box 20 is controlled by linear actuator 34. Energization of a solenoid overcomes the force of a mechanical spring that normally holds the flap open (to provide fail safe operation). Electrical interconnection 35 provides for both the energization of the circuit, as well as an indication of its position. Pressure sensor 40 measure the pressure drop across the filter element 18. A pressure differential greater than a predetermined value causes a warning signal to be sent to the cockpit via conduit 41.

FIG. 4 additionally shows the construction of the filter element 18. Multiple layers of cotton grid fabric 17 are pleated between two layers of bonded wire mesh 19. In addition to enhancing flow, the turned back side sections, as well as the bowed form of the center section, serve to increase the filter element's mechanical strength. The edges of such structure are subsequently potted in a thick layer of polyurethane to damp vibrations. Prior to use, the filter element is impregnated with an oil that has a bright yellow dye incorporated therein.

The air filtration system of the present invention is easily fitted or retrofitted to a rotorcraft. In addition to the removal of the components of any previously used filtration system, installation merely requires attachment of mounting ring 48 to fire wall 37. The air box 20 is then fitted thereto with the tightening of V-band clamp 42. Electrical interconnections to a power source, as well as the appropriate switches and warning lights within the cockpit, completes the installation. The filter element is impregnated with oil, its bright color giving a clean indication of coverage.

Figure 5:
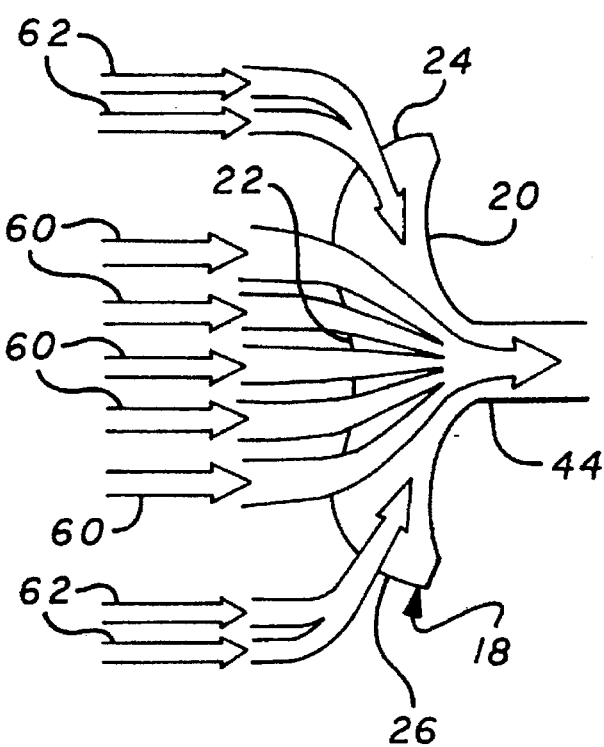
FIG. 5 is a cross-sectional view showing airflow through the filter.

In use, the turbine draws air through the filter element, the oil impregnated cotton grid fabric being capable of a 99% separation efficiency (standard A.C. Coarse Test Dust). In normal forward flight, air flows to the engine through forward facing inlets in the cowling and passes through the forward facing surface 22 of the filter element 18, as shown in FIG. 5. A minimal amount of resistance is encountered in such an air path 60, and the smooth shape of the bellmouth 44 promotes a clean laminar flow into the engine. As the forward facing area of filter element traps more and more particulates, an increasing amount of airflow enters through the filter's lateral surfaces 24, 26. Such flow path 62 does encounter more resistance by virtue of the change in direction the inducted air must undergo to enter and pass through the filter, but it is precisely the change in direction that prevents or delays the complete clogging of the filter. The abrupt change in direction serves to separate particles from the airflow causing them to continue in backward direction. Super cooled water droplets therefore tend to cling and freeze to none-essential surfaces, rather than icing up the filter element pleats to impede and ultimately restrict air flow.

Figure 6:
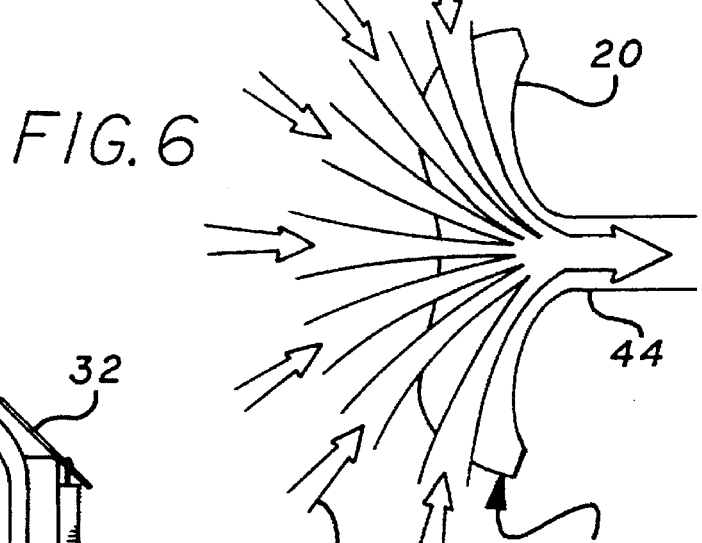
FIG. 6 is a cross-sectional view showing airflow through the filter.

The lateral facing filtering surfaces 24, 26 of the filter element 18 provide an additional benefit, as shown in FIG. 6. The contoured surface of the filtering element provides a straight flow path therethrough and to the bellmouth regardless of the direction in which airflow approaches the filter. If, for example, the rotorcraft is flown sideways, wherein more and more air enters the cowling through lateral intake ducts, as opposed to through the forward intake ducts, the lateral filtering surfaces provide a straight flow path 64 into the bellmouth to thereby minimize suction required by the engine.

The heavy potting 50 of the edges of the filter element 18 not only serves to more positively join the edges of the wire mesh and cotton grid fabric but insulates the filter element from the high vibrations it would otherwise by subject to. Additionally, the inward curvature of the face of the filter element adds strength to resist deformation due to any pressure differential it may be subject to.

Figure 7:
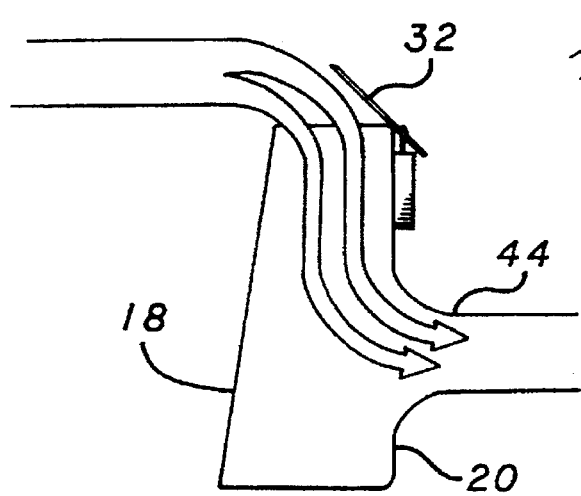
FIG. 7 is a cross-sectional view showing airflow through the bypass flap.
Figure 8:
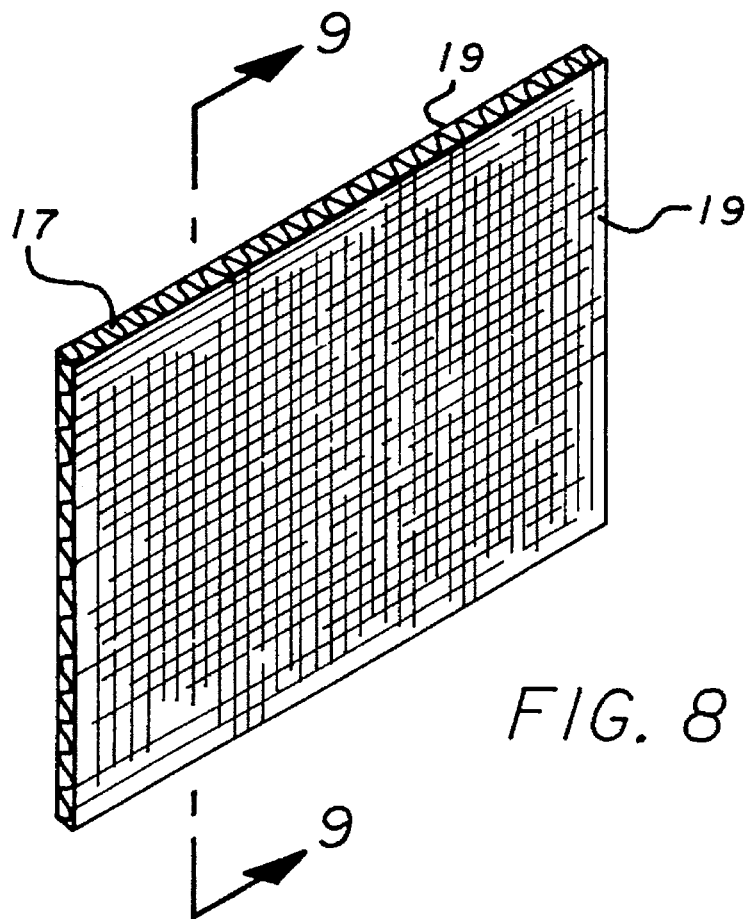
FIG. 8 is a perspective view of a portion of the filter element.
Figure 9:
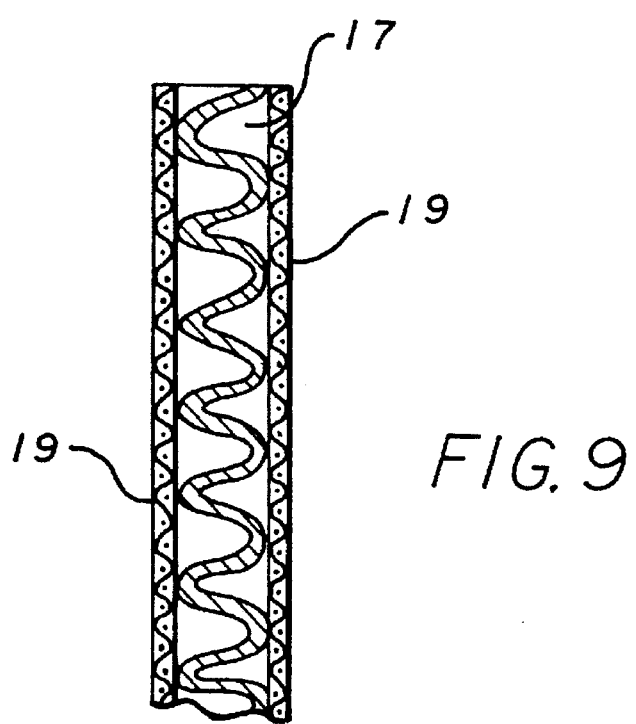
FIG. 9 is an enlarged side elevational view of a portion of the fiber element.

In the event the filter element does eventually become clogged to the point where the pressure drop across the filter, as measured by sensor 40, exceeds a preselected value, a warning signal is sent to the cockpit. This gives the pilot the option of opening bypass flap 32 to provide an alternate flow path for induction air thereby increasing safety of operation. The orientation of the flap relative to the inlet 18 forces airflow inducted into the engine to undergo two abrupt changes in direction thereby, as shown in FIG. 7 serving to separate particles from the airflow. Super cooled droplets separated from the flow of air will impact adjacent surfaces to which they freeze and cling, and will thereby avoid being inducted into the engine where they could cause damage.

Any particulate trapped by the filter will cause the appearance of the bright yellow color of the impregnating oil to darken. During maintenance of the aircraft, the technician can therefore immediately gauge the condition of the filter element by visual inspection. The filter element is easily removed by detachment of the fasteners, after which a cleaning solvent is applied, it is backflushed with water, dried, reimpregnated, and reinstalled.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. In an induction air filtration system for a turbine of a helicopter, said turbine having an inlet port and the helicopter having a longitudinal axis, the improvement in the induction air filtration system comprising:

a barrier type filter element disposed about said inlet port, said filter element being contoured to have a forward portion and lateral portions, said forward portion of said filter element being oriented substantially perpendicular to the longitudinal axis of the helicopter to receive airflow approaching said inlet port longitudinally, and said lateral portions of said filter element curving from said forward portion to be oriented substantially parallel to the longitudinal axis of the helicopter to receive airflow approaching said inlet port laterally whereby a straight path for airflow through the filter element to the turbine is available for both forward and sideways flight of the helicopter.

2. The air filtration system of claim 1 wherein said filter element has a pleated configuration and is impregnated with oil.

3. The air filtration system of claim 2 wherein said oil is brightly colored whereby the condition of filter element can be quickly gauged by visual inspection.

4. The air filtration system of claim 2 wherein said filter element further comprises cotton grid fabric held between two layers of stainless steel wire mesh, and wherein its edges are potted in a polyurethane material sufficiently thick to isolate said filter element from vibrations generated by the helicopter.

5. The air filtration system of claim 1 wherein said filter element is attached to an air box which is mounted to said engine inlet.

6. The air filtration system of claim 5 wherein said air box has a continuous bellmouth formed therein leading into said engine inlet.

7. The air filtration system of claim 6 wherein said bellmouth describes a smooth second derivative curve.

8. The air filtration system of claim 5 wherein said air box includes a moveable flap which, upon deployment, provides an alternative flow path for air inducted into said turbine inlet that bypasses said filter element.

9. The air filtration system of claim 8 further comprising means for monitoring an air pressure drop across said filter element wherein a pressure drop exceeding a preselected value causes a signal to be generated whereby a pilot may deploy said flap, bypass the filter element, and reduce the pressure loss to the engine.

10. In an induction air filtration system for a turbine of a helicopter, said turbine having an inlet port and the helicopter having a longitudinal axis, the improvement in the induction air filtration system comprising:

a barrier type filter element disposed about said inlet port, said filter element being contoured to have a forward portion and lateral positions, said forward portion being oriented substantially perpendicular to the longitudinal axis of the helicopter to receive airflow during normal forward flight through said forward portion of said filter element and into said inlet port without requiring said airflow to undergo a change in direction, said forward portion being bowed inward, and said lateral portions curving from said forward portion to be oriented substantially parallel to the longitudinal axis of the helicopter to receive airflow approaching said inlet port laterally to require said airflow to undergo an abrupt change in direction to pass through said filter element and into said inlet port whereby air entering said lateral portions of said filter element is subject to a particle separating effect and thereby prevents or delays said lateral portions from becoming clogged.

11. The induction air filtration system of claim 10 further comprising an air box mounted to said inlet to which said filter element is mounted wherein said air box includes a flap which, upon deployment, allows air entering said inlet to bypass said filter element.

12. The induction air filtration system of claim 10 wherein said flap is oriented to cause airflow entering therethrough to undergo an abrupt change in direction thereby achieving a particle separating effect.

13. The induction air filter system of claim 10, wherein the edges of the filter element are potted in a vibration insulating material to isolate said filter element from vibrations generated by the helicopter.

14. A method for filtering air inducted into the turbine inlet of a helicopter, comprising the steps of:

contouring and orienting a barrier-type filter element in front of said turbine inlet so as to provide a filtering surface having a forward portion substantially perpendicular to a longitudinal axis of the helicopter and lateral portions curving from said forward portion to be substantially parallel to the helicopter longitudinal axis to receive airflow from flow paths approaching said inlet from a plurality of d[00d0]rections; and providing a smoothly contoured surface between said filtering element and said inlet to promote an attached airflow into said inlet.

15. The method of claim 14 further comprising the step of:

providing an optionally available alternate path into said inlet that bypasses said filter element.

16. The method of claim 14, wherein said step of contouring and orienting said barrier-type filter element simultaneously enables airflow approaching along said helicopter's longitudinal axis to pass through said filter element into said inlet without changing direction, as well as enabling such airflow to pass therethrough upon having made an abrupt change in direction.

17. The method of claim 16 further comprising the steps of:

providing an optionally available flow path into said inlet that bypasses said filter element and that requires airflow to make an abrupt change in direction.

\* \* \* \* \*